United States Patent
Zuelch

(10) Patent No.: US 8,439,419 B2
(45) Date of Patent: May 14, 2013

(54) FLIPPER PANEL ASSEMBLY

(75) Inventor: Matthew Zuelch, Royal Oak, MI (US)

(73) Assignee: Magna Seating Inc., Aurora, Ontario (CA)

( * ) Notice: Subject to any disclaimer, the term of this patent is extended or adjusted under 35 U.S.C. 154(b) by 252 days.

(21) Appl. No.: 13/057,552

(22) PCT Filed: Aug. 6, 2009

(86) PCT No.: PCT/CA2009/001104
§ 371 (c)(1),
(2), (4) Date: Feb. 4, 2011

(87) PCT Pub. No.: WO2010/015085
PCT Pub. Date: Feb. 11, 2010

(65) Prior Publication Data
US 2011/0133508 A1    Jun. 9, 2011

Related U.S. Application Data

(60) Provisional application No. 61/087,346, filed on Aug. 8, 2008.

(51) Int. Cl.
*B60N 2/02* (2006.01)
(52) U.S. Cl.
USPC ........................................... 296/65.16
(58) Field of Classification Search ........... 296/65.16, 296/66, 24.43, 63; 248/429
See application file for complete search history.

(56) References Cited

U.S. PATENT DOCUMENTS

| | | | | |
|---|---|---|---|---|
| 2,926,951 A * | 3/1960 | Koplin | | 296/66 |
| 3,011,822 A * | 12/1961 | May et al. | | 296/66 |
| 3,053,565 A * | 9/1962 | Farrow | | 296/66 |
| 3,097,881 A * | 7/1963 | Aguilar | | 296/66 |
| 3,328,070 A | 6/1967 | Jermain, Jr. | | |
| 4,198,091 A | 4/1980 | Appleton | | |
| 5,322,335 A * | 6/1994 | Niemi | | 296/97.23 |
| 5,716,091 A | 2/1998 | Wieczorek | | |
| 6,623,061 B2 | 9/2003 | Tourangeau et al. | | |
| 6,648,395 B2 | 11/2003 | Hoshino | | |
| 6,672,662 B1 * | 1/2004 | Balk | | 297/244 |
| 6,698,829 B1 * | 3/2004 | Freijy et al. | | 297/188.09 |
| 6,817,660 B2 | 11/2004 | Ito et al. | | |
| 7,044,550 B2 | 5/2006 | Kim | | |
| 7,216,916 B2 * | 5/2007 | Czerwinski et al. | | 296/66 |
| 7,686,367 B2 * | 3/2010 | Neale | | 296/64 |
| 7,699,398 B2 * | 4/2010 | Sokolla et al. | | 297/377 |
| 8,186,736 B2 * | 5/2012 | Jouraku | | 296/37.16 |
| 8,196,990 B2 * | 6/2012 | Aebker et al. | | 296/69 |
| 2006/0061120 A1 * | 3/2006 | Czerwinski et al. | | 296/63 |
| 2008/0185866 A1 * | 8/2008 | Tarrant et al. | | 296/97.22 |
| 2010/0327635 A1 * | 12/2010 | Whalen et al. | | 297/129 |

* cited by examiner

*Primary Examiner* — Kiran B Patel
(74) *Attorney, Agent, or Firm* — Miller Canfield

(57) ABSTRACT

A flipper panel assembly for covering a gap between a seat assembly and a cargo load floor. The seat assembly is movable forward and rearward and includes a pivotal seat back. The flipper panel assembly includes a main panel slidably disposed on the cargo load floor and fixedly secured to the seat assembly. A flipper panel is pivotally coupled to the main panel. The flipper panel assembly translates along the cargo load floor in response to moving the seat assembly forward and rearward. The flipper panel pivots in response to pivotal movement of the seat back.

8 Claims, 5 Drawing Sheets

FLIPPER PANEL ASSEMBLY

CROSS-REFERENCE TO RELATED APPLICATION

This application claims priority to and all the benefits of U.S. Provisional Application No. 61/087,346, filed on Aug. 8, 2008 and entitled "Flipper Panel Assembly."

BACKGROUND OF THE INVENTION

1. Field of the Invention

The invention relates to a flipper panel assembly associated with a load floor and a rear seat assembly in a motor vehicle. More particularly, the invention relates to a flipper panel assembly for covering a gap between a back side of a foldable and slidably adjustable rear seat assembly and a cargo area having a load floor.

2. Description of Related Art

Motor vehicles often include a rear seat assembly that is mounted to a floor in the vehicle in front of a cargo area having a load floor. Typically, the rear seat assembly includes a seat back that can be folded forward from an upright seating position to a stowed position, either onto a seat cushion or the vehicle floor in order to extend the load floor of the cargo area. With the seat back in either the upright or stowed position, a gap is present between a back side of the rear seat assembly and the load floor which is unsightly and may allow articles being transported in the cargo area to fall therein.

In U.S. Pat. No. 5,716,091 issued to Wieczorek, a gap between a rear seat and a load floor is covered by a flipper panel. One end of the flipper panel is pivotally mounted to the load floor and another end of the flipper panel rests against a back side of a seat back such that the flipper panel covers the gap as the seat back pivots between an upright seating position and a stowed position. The seat is limited, however, in that it is not slidably movable for forward and rearward adjustment.

In U.S. Pat. No. 7,216,916 issued to Czerwinski et al., a rear seat is slidably coupled to a vehicle floor for forward and rearward movement and a main gap between the rear seat and a load floor is bridged by a flipper panel. The flipper panel extends between a forward end and a rearward end. The forward end of the flipper panel is pivotally mounted to a seat support member that is secured to the rear seat and the rearward end of the flipper panel is slidably disposed on the load floor. Forward and rearward movement of the rear seat changes the main gap between the rear seat and the load floor. As the main gap changes, the flipper panel continues to bridge the main gap as the flipper panel slides along the load floor. A secondary gap is provided between a seat back and the forward end of the flipper panel to provide clearance for allowing the seat back to pivot between an upright seating position and a stowed position. Since the flipper panel does not rest against a back side of the seat back, the secondary gap is always present between the back side of the seat back and the forward end of the flipper panel. Therefore, the potential for articles to fall therein always remains.

It is therefore desirable to provide a flipper panel assembly that will cover or bridge a gap between a slidably adjustable rear seat assembly and a load floor of a cargo area. It is also desirable that the flipper panel assembly rest against a back side of a seat back to completely cover or bridge the gap as the seat back pivots between an upright seating position and a forwardly folded stowed position.

SUMMARY OF THE INVENTION

According to one aspect of the invention, a flipper panel assembly is provided for covering a gap between a vehicle seat assembly and a cargo load floor. The seat assembly is movable forward and rearward and includes a pivotal seat back. The flipper panel assembly includes a main panel and a flipper panel. The main panel is slidably disposed on the cargo load floor and fixedly secured to the seat assembly. The flipper panel is pivotally coupled to the main panel. The flipper panel assembly translates along the cargo load floor in response to moving the seat assembly forward and rearward. The flipper panel pivots in response to pivotal movement of the seat back.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
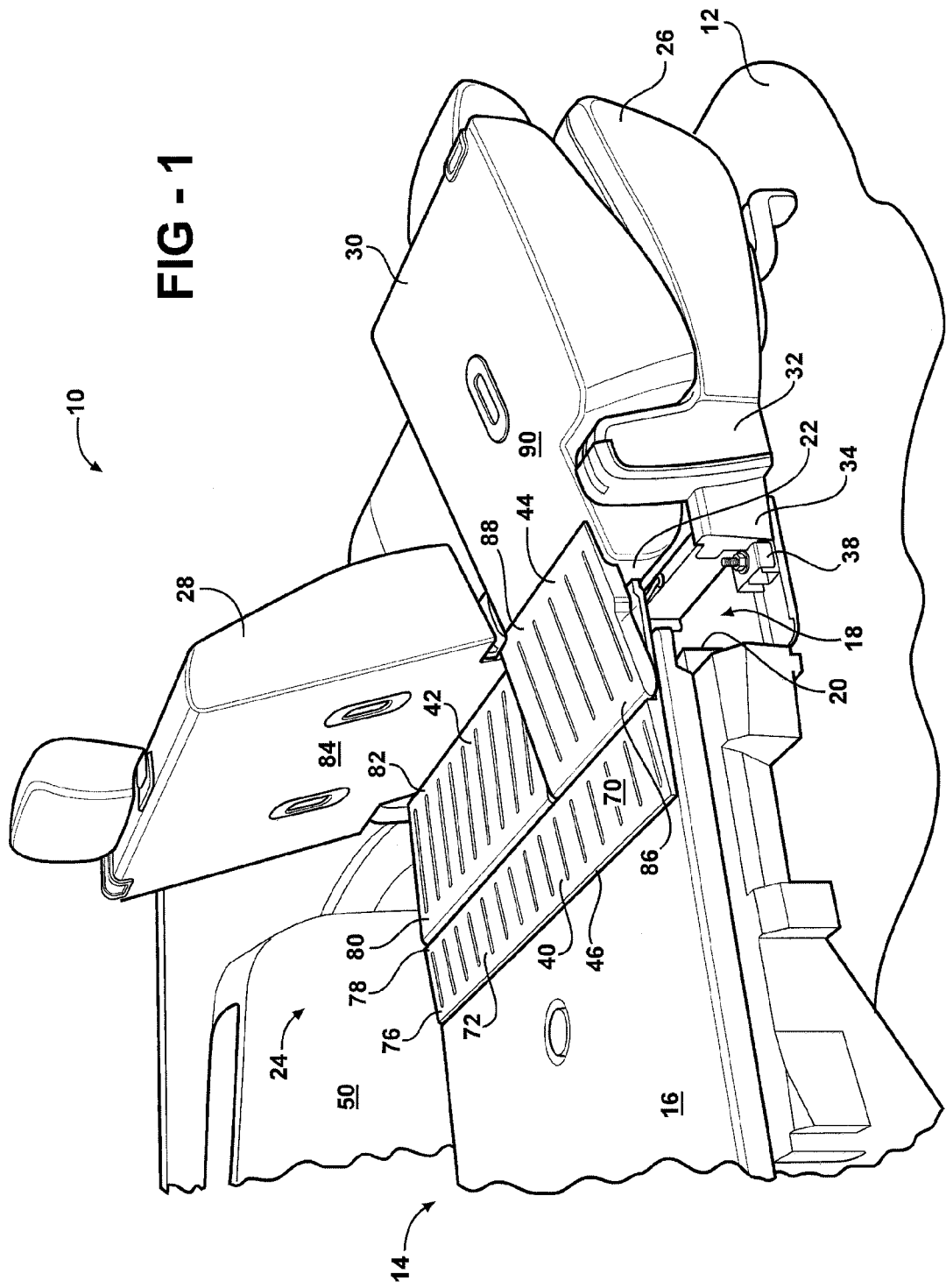
FIG. 1 is a side perspective view of an interior of a motor vehicle including a flipper panel assembly disposed between a rear seat assembly and a load floor according to one embodiment of the invention.

Referring to the Figures, FIG. 1 discloses a rear seat assembly, generally shown at 10, disposed within an interior compartment of a motor vehicle. The rear seat assembly 10 is slidably mounted to a main floor 12 of the vehicle in front of a rear cargo area 14 having a load floor 16. In the embodiment shown, the load floor 16 is disposed generally higher than or upwardly relative to the main floor 12. Thus, a gap 18 is defined between a vertical front edge 20 of the load floor 16 and a back side 22 of the rear seat assembly 10. A flipper panel assembly, generally shown at 24, is disposed between the rear seat assembly 10 and the load floor 16 for covering or bridging the gap 18 therebetween.

The rear seat assembly 10 shown in the Figures is a 60-40 split seat that includes a seat cushion 26, a sixty percent seat back 28 and a forty percent seat back 30. Each of the sixty percent seat back 28 and the forty percent seat back 30 is pivotally coupled to a rearward end 32 of the seat cushion 26 to allow for independent pivotal movement of the respective sixty and forty percent seat backs 28, 30 between a generally upright seating position and a forwardly folded stowed position overlying the seat cushion 26. In the Figures, the sixty percent seat back 28 is in the upright seating position and the forty percent seat back 30 is in the stowed position.

Figure 2:
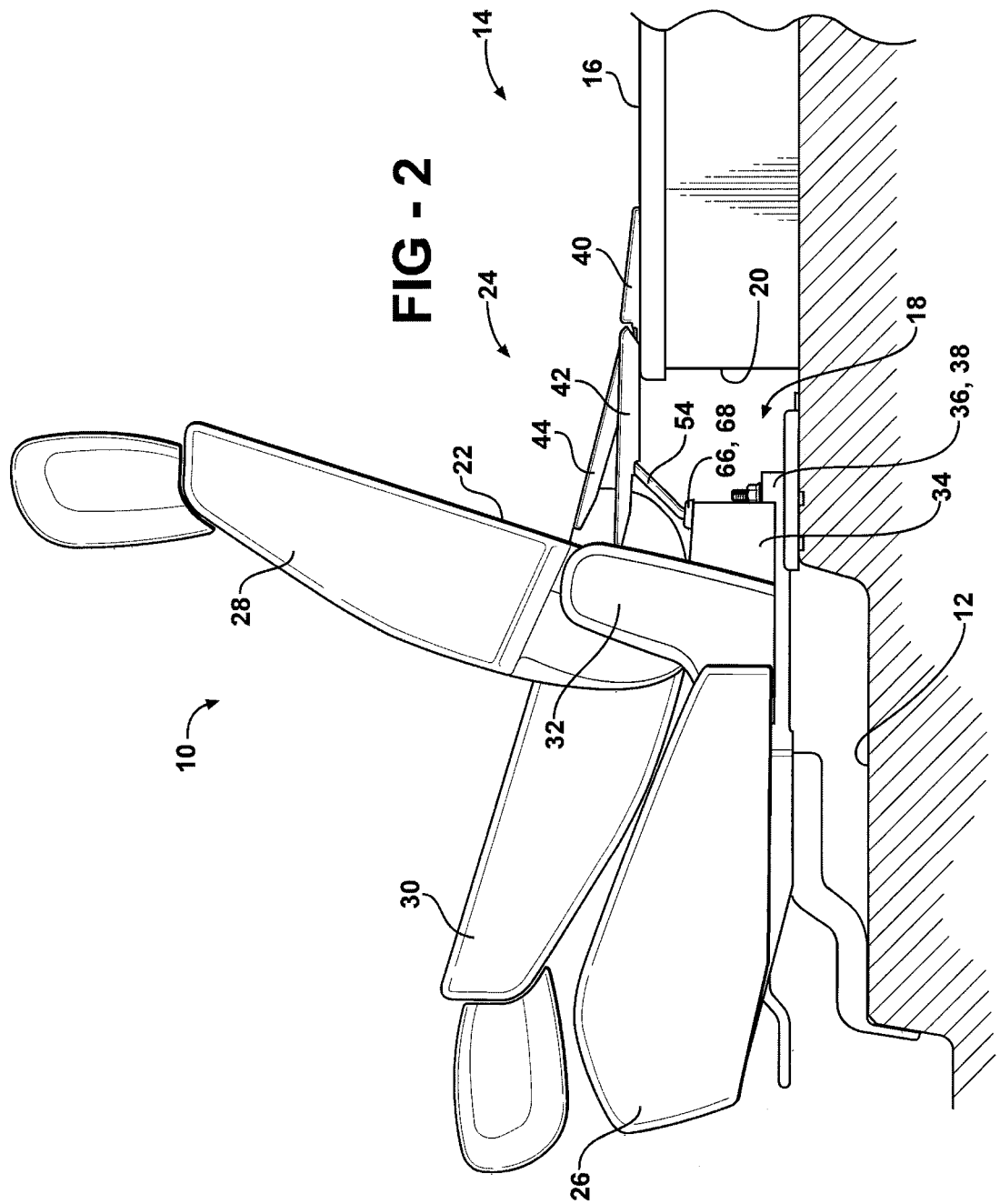
FIG. 2 is a side view of the flipper panel assembly disposed between the rear seat assembly and the load floor.
Figure 4:
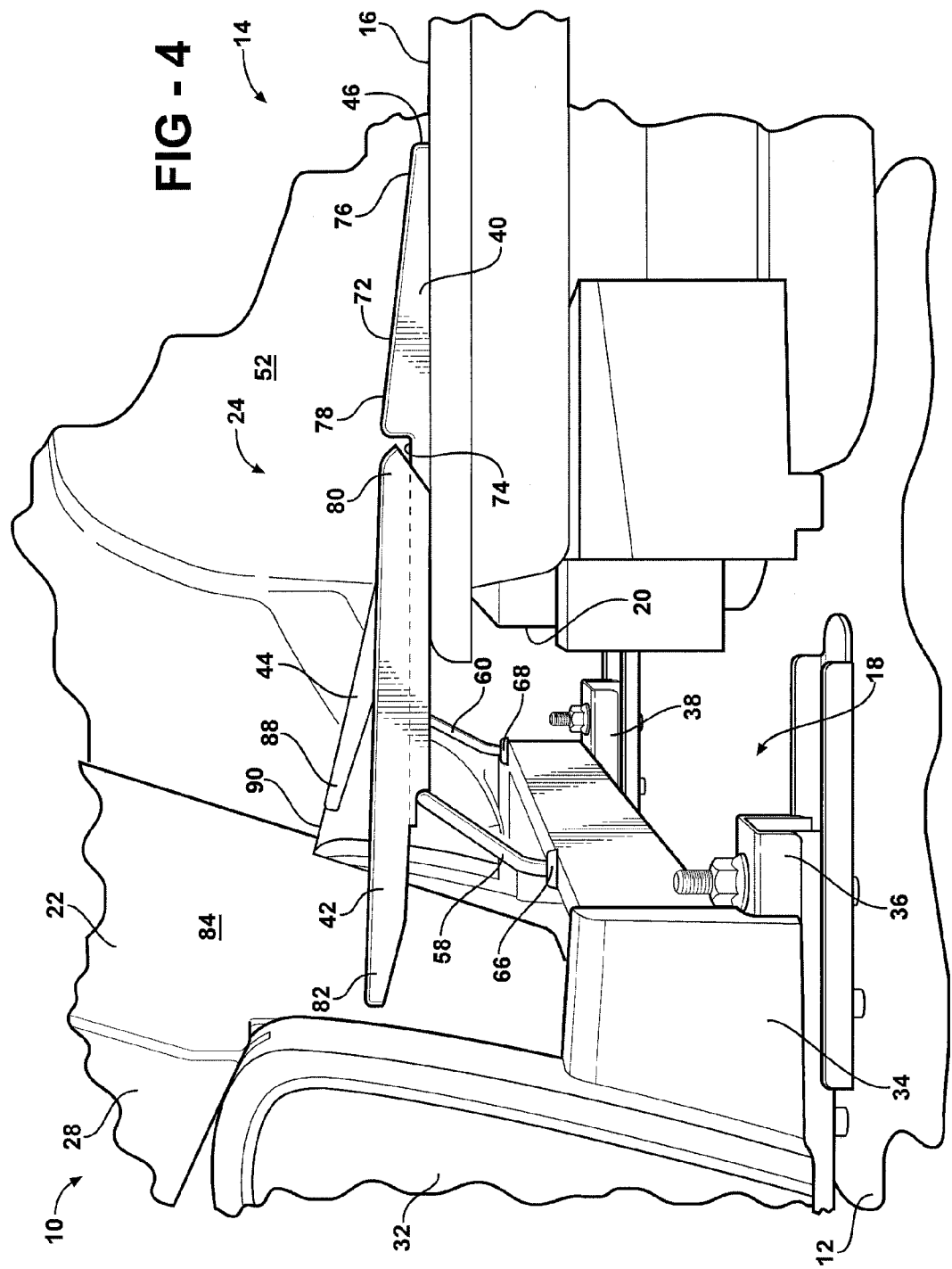
FIG. 4 is an enlarged side view of the flipper panel assembly disposed between the rear seat assembly and the load floor.

Referring to FIGS. 1, 2, and 4, the seat cushion 26 is mounted to a seat cushion frame 34, which in turn is slidably coupled to the main floor 12 in the vehicle by a pair of seat track assemblies 36, 38 that extend in a longitudinal direction, as is well known in the art. The seat track assemblies 36, 38 are operable between a locked condition and an unlocked condition for selective sliding movement of the rear seat assembly 10. In the locked condition, the rear seat assembly 10 is fixed in place. In the unlocked condition, the rear seat assembly 10 is selectively adjustable forward and rearward in the longitudinal direction along the main floor 12. As the rear seat assembly 10 moves forward and rearward the size of the gap 18 between the rear seat assembly 10 and the load floor 16 increases and decreases, respectively.

Figure 3:
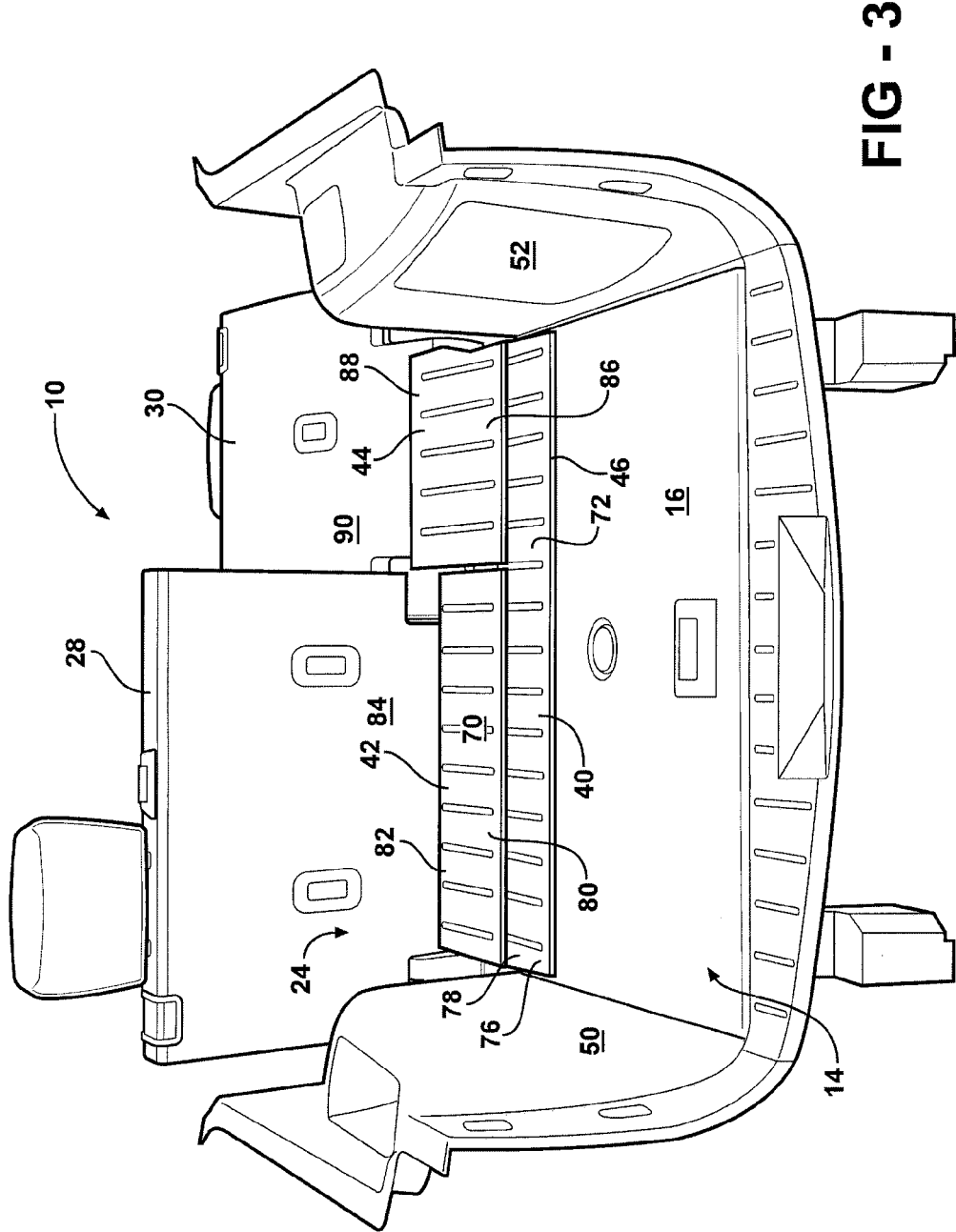
FIG. 3 is a rear perspective view of the interior of the motor vehicle including the flipper panel assembly.
Figure 5:
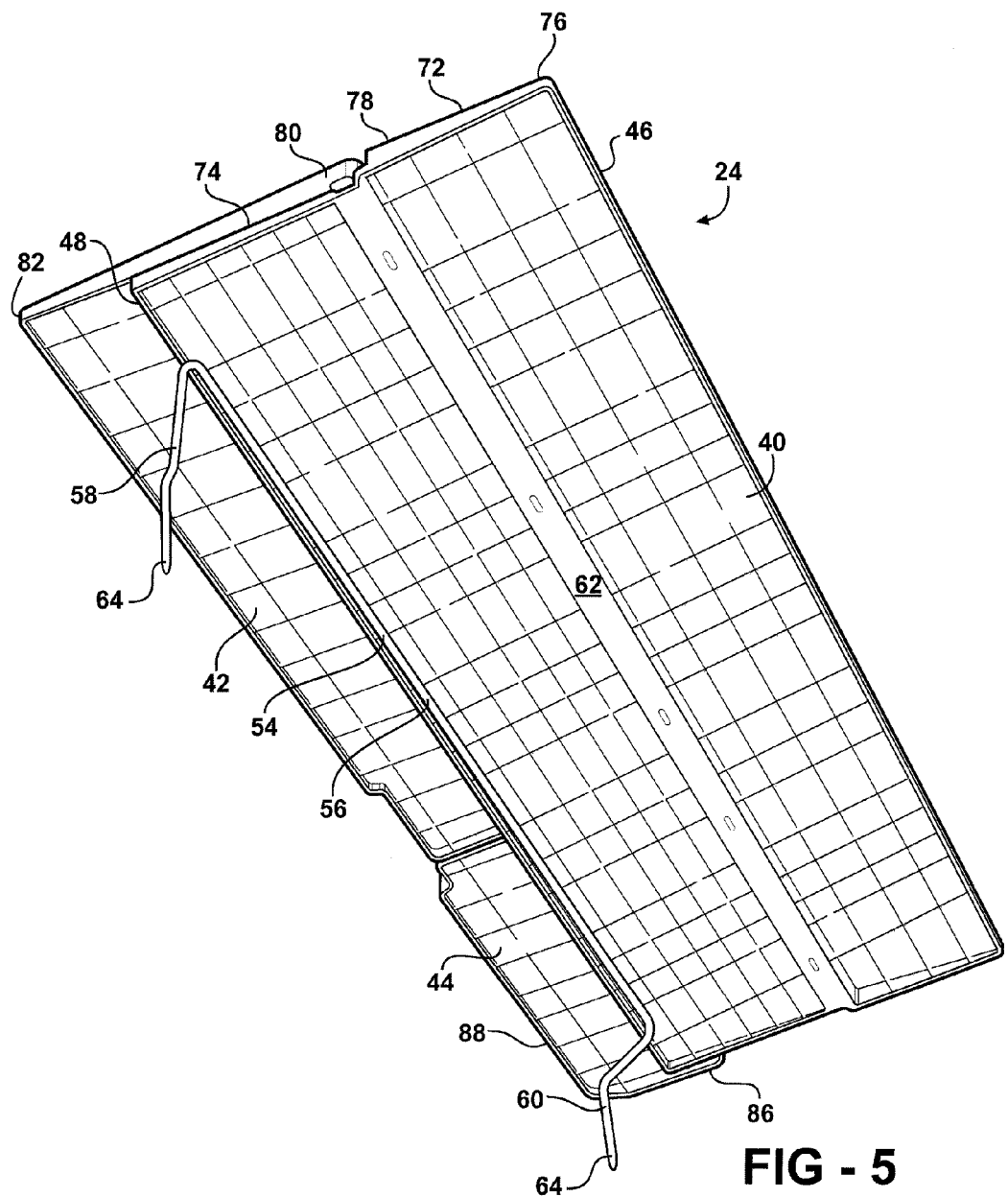
FIG. 5 is a bottom perspective view of the flipper panel assembly.

The flipper panel assembly 24 is operatively coupled between the rear seat assembly 10 and the load floor 16 to cover or bridge the gap 18 as the rear seat assembly 10 moves forward and rearward regardless of whether one or both of the sixty and forty percent seat backs 28, 30 are in the upright seating position or the stowed position. The flipper panel assembly 24 includes a main panel 40, a sixty percent flipper panel 42, and a forty percent flipper panel 44. The main panel 40 extends in the longitudinal direction between a first rearward end 46 and a second forward end 48, as shown in FIG. 5. The main panel 40 extends in a lateral direction generally the entire width of the rear cargo area 14 between a pair of inner quarter trim panels 50, 52, as shown in FIG. 3. The rearward end 46 of the main panel 40 is disposed on the load floor 16 and is adapted to slide therealong as the rear seat assembly 10 moves forward and rearward. The forward end 48 of the main panel 40 is supported by a rod 54 which connects the flipper panel assembly 24 to the rear seat assembly 10 such that the flipper panel assembly 24 moves or translates forward and rearward with the rear seat assembly 10. More specifically, the rod 54 is generally U-shaped, as shown in FIG. 5, and includes a laterally extending portion 56 and two legs 58, 60 extending generally downwardly therefrom. The laterally extending portion 56 of the rod 54 is fixedly secured to a bottom surface 62 of the main panel 40, at the forward end 48 thereof. A distal end 64 of each leg 58, 60 is inserted into a respective housing 66, 68, and each housing 66, 68 in turn is connected to the seat cushion frame 34, adjacent the rearward end 32 of the seat cushion 26, as shown in FIG. 4. The housings 66, 68 may be any variety of suitable housing including a typical head restraint guide tube as is well known to one skilled in the art.

Referring to FIGS. 2 and 4, the main panel 40 does not extend entirely across the gap 18 between the rear seat assembly 10 and the load floor 16. A portion or remainder of the gap 18 is left between the forward end 48 of the main panel 40 and each of the sixty percent seat back 28 and the forty percent seat back 30 to provide enough clearance to allow the respective sixty and forty percent seat backs 28, 30 to pivot between the upright seating position and the stowed position. The sixty percent flipper panel 42 and the forty percent flipper panel 44 cover the remainder of the gap 18 as described below in detail.

A top surface 70 of the main panel 40 includes a ramp or incline portion 72 and a recess portion 74. The ramp portion 72 slopes upwardly from a lower end 76 at the rearward end 46 of the main panel 40 toward a higher end 78 generally midway between the rearward and forward ends 46, 48 of the main panel 40. The ramp portion 72 provides a slope to help guide a load on the load floor 16 over the main panel 40 onto the sixty and forty percent flipper panels 42, 44. The recess portion 74 is disposed adjacent the higher end 78 of the ramp portion 72 and extends therefrom to the forward end 48 of the main panel 40.

The sixty percent flipper panel 42 extends in the longitudinal direction between a first proximal end 80 and a second distal end 82. The sixty percent flipper panel 42 is aligned with the sixty percent seat back 28 and extends in the lateral direction generally the entire width thereof. The proximal end 80 of the sixty percent flipper panel 42 is pivotally coupled to the recess portion 74 of the main panel 40 directly adjacent the higher end 78 of the ramp portion 72. The distal end 82 of the sixty percent flipper panel 42 extends forwardly of the forward end 48 of the main panel 40 towards the sixty percent seat back 28 to cover the remainder of the gap 18 between the rear seat assembly 10 and the load floor 16. When the sixty percent seat back 28 is in the upright seating position the sixty percent flipper panel 42 is supported by the recess portion 74 of the main panel 40 in a generally horizontal position with the distal end 82 directly adjacent a lower back side 84 of the sixty percent seat back 28. In the generally horizontal position, the sixty percent flipper panel 42 and the main panel 40 entirely cover the gap 18 between the rear seat assembly 10 and the load floor 16. When the sixty percent seat back 28 is pivoted to the stowed position, the lower back side 84 of the sixty percent seat back 28 engages the distal end 82 of the sixty percent flipper panel 42 and pivots the sixty percent flipper panel 42 upwards about the proximal end 80 away from the recess portion 74 of the main panel 40 to an inclined position. In the inclined position, the sixty percent flipper panel 42 and the main panel 40 entirely cover the gap 18 between the rear seat assembly 10 and the load floor 16. It is appreciated that because the flipper panel assembly 24 is connected to the rear seat assembly 10 by the rod 54, the sixty percent flipper panel 42 and the main panel 40 will cover the gap 18 behind the sixty percent seat back 28 when the rear seat assembly 10 is adjusted to any forward or rearward position along the seat track assemblies 36, 38.

Similarly, the forty percent flipper panel 44 extends in the longitudinal direction between a first proximal end 86 and a second distal end 88. The forty percent flipper panel 44 is aligned with the forty percent seat back 30 and extends in the lateral direction generally the entire width thereof. The proximal end 86 of the forty percent flipper panel 44 is pivotally coupled to the recess portion 74 of the main panel 40 directly adjacent the higher end 78 of the ramp portion 72. The distal end 88 of the forty percent flipper panel 44 extends forwardly of the forward end 48 of the main panel 40 towards the forty percent seat back 30 to cover the remainder of the gap 18 between the rear seat assembly 10 and the load floor 16. When the forty percent seat back 30 is in the upright seating position, the forty percent flipper panel 44 is supported by the recess portion 74 of the main panel 40 in a generally horizontal position with the distal end 88 directly adjacent a lower back side 90 of the forty percent seat back 30. In the generally horizontal position, the forty percent flipper panel 44 and the main panel 40 entirely cover the gap 18 between the rear seat assembly 10 and the load floor 16. When the forty percent seat back 30 is pivoted to the stowed position, the lower back side 90 of the forty percent seat back 30 engages the distal end 88 of the forty percent flipper panel 44 and pivots the forty percent flipper panel 44 upwards about the proximal end 86 away from the recess portion 74 of the main panel 40 to an inclined position. In the inclined position, the forty percent flipper panel 44 and the main panel 40 entirely cover the gap 18 between the rear seat assembly 10 and the load floor 16. It is appreciated that because the flipper panel assembly 24 is connected to the rear seat assembly 10 by the rod 54, the forty percent flipper panel 44 and the main panel 40 will cover the gap 18 behind the forty percent seat back 30 when the rear seat assembly 10 is adjusted to any forward or rearward position along the seat track assemblies 36, 38.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. In combination, a vehicle seat assembly for supporting a passenger above a main floor and a flipper panel assembly slidable along a cargo load floor, said combination comprising:
- a seat cushion slidably coupled to the main floor allowing selective movement of said seat assembly forward and rearward along the main floor;
- a seat back pivotally coupled to said seat cushion, said seat back pivotal between an upright seating position and a forwardly folded stowed position;
- a main panel slidably disposed on the cargo load floor and fixedly secured to said seat cushion, said flipper panel assembly translating along the cargo load floor in response to moving said seat assembly forward and rearward; and
- a flipper panel pivotally coupled to said main panel, wherein said seat back engages said flipper panel in response to pivoting said seat back between said upright seating position and said forwardly folded stowed position thereby pivoting said flipper panel;
- wherein said main panel and said flipper panel cover a gap between the cargo load floor and said seat assembly.

2. A combination as set forth in claim 1 wherein said main panel extends between a first end slidably disposed on the cargo load floor and a second end fixedly secured to said seat cushion and said flipper panel extends between a proximal end pivotally coupled to said main panel and a distal end engageable with said seat back.

3. A combination as set forth in claim 2 wherein said distal end of said flipper panel is disposed directly adjacent said seat back with said seat back in said upright seating position and said seat back engages said distal end to pivot said flipper panel in response to pivoting said seat back to said forwardly folded stowed position.

4. A combination as set forth in claim 3 including a rod, said rod having a laterally extending portion and at least one leg extending generally downwardly, said laterally extending portion fixedly secured to a bottom surface of said main panel at said second end thereof and said least one leg fixedly secured to said seat cushion.

5. A combination as set forth in claim 4 wherein said main panel includes a top surface having an incline portion and a recess portion, said incline portion sloping upwardly from said first end to said recess portion.

6. A combination as set forth in claim 5 wherein said proximal end of said flipper panel is pivotally coupled to said recess portion of said main panel adjacent said incline portion.

7. A combination as set forth in claim 6 wherein said distal end of said flipper panel extends forwardly beyond said second end of said main panel.

8. A combination as set forth in claim 7 wherein said flipper panel assembly includes first and second flipper panels pivotally coupled to said main panel.

\* \* \* \* \*